Sept. 13, 1955     C. E. SWENSON     2,717,677
ONE WAY CLUTCHES
Filed Sept. 1, 1951
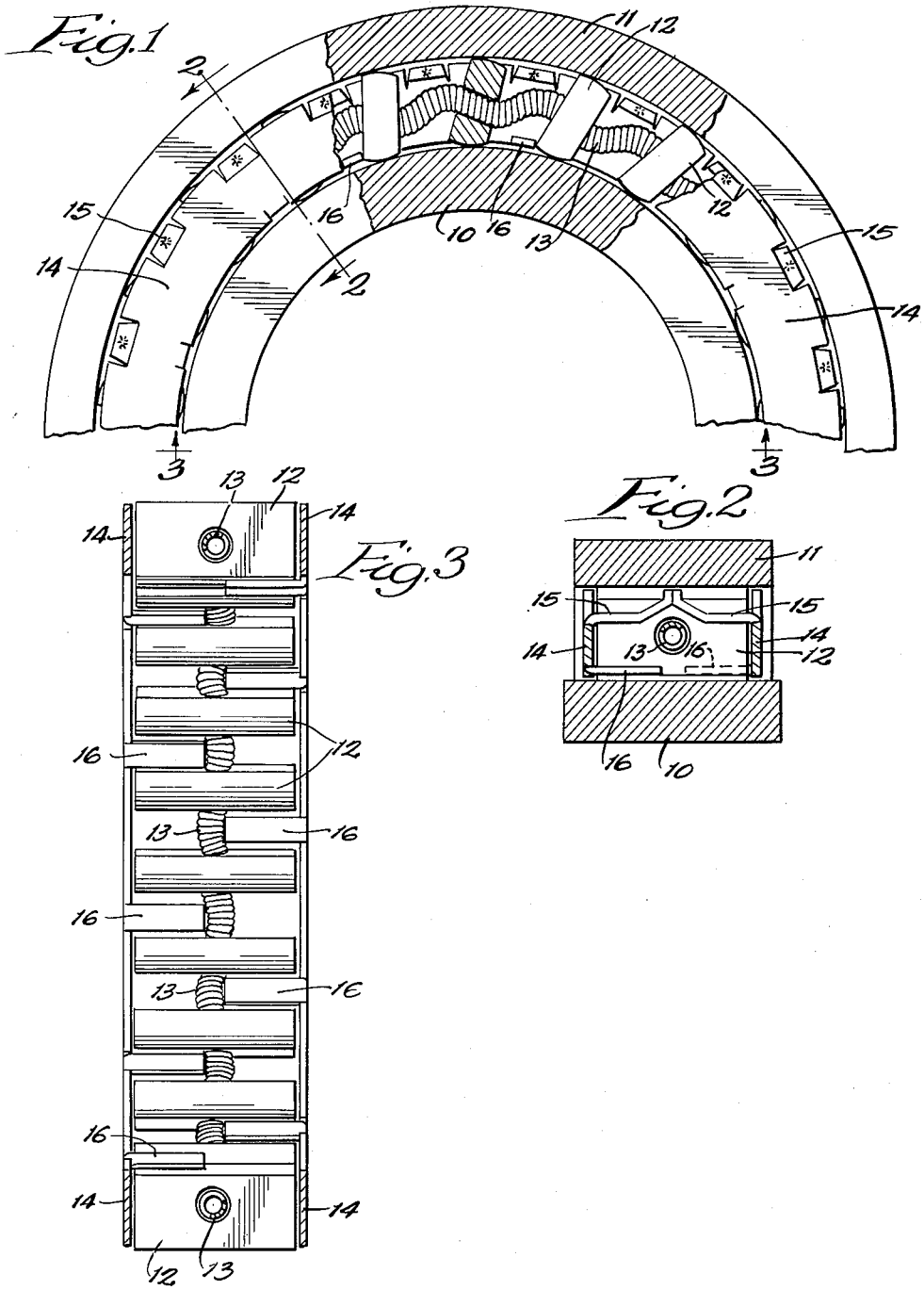
INVENTOR:
Carl E. Swenson,
BY
E. L. Borth,
ATTORNEY.

United States Patent Office 2,717,677
Patented Sept. 13, 1955

2,717,677
ONE WAY CLUTCHES

Carl E. Swenson, Rockford, Ill., assignor to Borg-Warner Corporation, Chicago, Ill., a corporation of Illinois Application September 1, 1951, Serial No. 244,773

2 Claims. (Cl. 192—45.1)

This invention relates to one way clutches and more particularly to a one way clutch cage construction for a clutch of the tilting gripper type.

It is desirable in one way clutches of the tilting gripper type to provide a cage which is light, compact and inexpensive to make, and which will positively limit tilting of the grippers and will hold the grippers assembled for handling prior to their mounting between the races.

It is one of the objects of the present invention to provide a one way clutch having a cage possessing these desirable characteristics.

Another object is to provide a one way clutch in which a rigid one piece cage construction is provided to co-operate with the spring utilized to control tilting of the grippers to hold the grippers assembled against disassembly in either direction.

According to one feature of the invention, the cage is provided with staggered cross bars so spaced that the spring must be bent sinuously to pass between them and which are engageable with the spring to prevent accidental disassembly of the grippers.

The above and other objects and features of the invention will be more readily apparent from the following description when read in connection with the accompanying drawing in which:

Figure 1 is a partial end view of a one way clutch embodying the invention with parts in section;

Figure 2 is a section on the line 2—2 of Figure 1; and

Figure 3 is a view looking from the inside of the assembly substantially on the line 3—3 of Figure 1.

The clutch as shown, is adapted to connect an inner cylindrical race 10 to an outer cylindrical race 11 whose inner surface is coaxial with and spaced from the outer surface of the race 10. The races are adapted to be connected for rotation in one direction by a series of tiltable grippers 12 whose ends are curved about spaced centers so that they will bind against the races when tilted in one direction and will release the races when tilted in the opposite direction.

As shown, the grippers will bind when tilted counter-clockwise and will release when tilted clockwise. The grippers are urged into engagement with the races by an annular coil spring 13 which is threaded through central openings in the grippers. The openings are at such an angle that the spring will be bent radially as shown, to exert a tilting force on the grippers.

The grippers are held assembled and tilting thereof is limited by means of an annular one piece cage which fits between the races as shown. The cage is formed of two identical annular members each having a flat side ring 14 with spaced fingers 15 extending inward from the outer edges of the side rings. The fingers are bent outward at their inner ends and abut together where they are welded or otherwise rigidly secured to form a unitary assembly. When so connected, the fingers 15 form cross bars extending between adjacent pairs of grippers to hold the grippers spaced and to engage and limit tilting thereof.

At their inner edges the rings 14 are formed with inwardly extending fingers 16 which are slightly shorter than the fingers 15. As best seen in Figure 3, each side ring carries only half as many fingers 16 as it does fingers 15 and the rings are assembled in such a position that the fingers 16 on the opposite rings are circumferentially staggered. The length of the fingers 16 is such that the axial space between their ends is less than the diameter of the spring 13.

With this construction the cage may be completely assembled by welding or otherwise, securing the ends of the fingers 15 together and the grippers may be threaded onto the spring 13 whose ends are then connected to form a complete annular spring. To assemble the grippers and spring in the cage the spring is bent sinuously as shown in Figure 3 to pass around the ends of the fingers 16 and the grippers are slipped into the spaces between the adjacent fingers 15 and 16.

After the spring passes the ends of the fingers 16 it will spring back into a single radial plane so that if the grippers tend to move radially inward in the cage the spring will engage the ends of the fingers 16. In this way accidental displacement of the grippers radially inward is prevented by the fingers 16 and the fingers 15 which extend completely between the side rings 14 will prevent accidental outer movement of the grippers and spring.

The cage construction as shown, can be formed of identical sheet metal parts very easily and inexpensively and when completed will be very light. At the same time the fingers 15 and 16 will have sufficient strength to prevent excessive tilting of the grippers by engagement with the ends thereof thereby to prevent damage to the spring.

While one embodiment of the invention has been shown and described in detail, it will be understood that this is illustrative only and is not to be taken as a definition of the scope of the invention, reference being had for this purpose to the appended claims.

What is claimed is:

1. A one way clutch comprising a series of tiltable grippers, a cage including a pair of flat annular side rings, fingers extending from one edge of the side rings between adjacent grippers and rigidly connecting the side rings, fingers extending from the other edge of the side rings between adjacent grippers and being circumferentially staggered and of a length less than the axial distance between the rings to define staggered openings in the cage, and an annular spring connecting the grippers and of a diameter such that when it lies in a plane normal to the cage axis it will engage the last named fingers so that the spring must be sinuously bent to be inserted through the staggered openings.

2. A one way clutch comprising a series of tiltable grippers, a cage including a pair of flat annular side rings, fingers extending from one edge of the side rings between adjacent grippers, the ends of said fingers being bent to extend radially and being secured together face-to-face and rigidly connecting the side rings, fingers extending from the other edge of the side rings between adjacent grippers and being circumferentially staggered and of a length less than the axial distance between the rings to define staggered openings in the cage, each of the grippers having a central opening therethrough, and an annular coil spring threaded through the openings and of a diameter such that when it lies in a plane normal to the cage axis it will engage the last named fingers so that the spring must be sinuously bent to be inserted through the staggered openings.

References Cited in the file of this patent

UNITED STATES PATENTS

| 1,147,497 | Freed    | July 20, 1915 |
| 1,940,124 | Gibbons  | Dec. 19, 1933 |
| 2,016,923 | Herrmann | Oct. 8, 1935  |
| 2,386,013 | Swenson  | Oct. 2, 1945  |